United States Patent [19]

Bierschenk et al.

[11] Patent Number: 4,931,199

[45] Date of Patent: Jun. 5, 1990

[54] USE OF CHLOROFLUOROPOLYETHERS AS LUBRICANTS FOR REFRIGERANTS

[75] Inventors: Thomas R. Bierschenk; Timothy J. Juhlke, both of Roundrock; Richard J. Lagow, Austin; Hajimu Kawa, Georgetown, all of Tex.

[73] Assignee: Exfluor Research Corporation, Austin, Tex.

[21] Appl. No.: 355,771

[22] Filed: May 23, 1989

[51] Int. Cl.$^5$ ............... C10M 105/54; C10M 107/38; C10M 131/02; C09K 5/02

[52] U.S. Cl. ......................... 252/68; 252/69; 252/52 A; 252/52 R; 252/58

[58] Field of Search .............. 252/52 A, 52 R, 58, 252/68, 69

[56] References Cited

U.S. PATENT DOCUMENTS

| | | |
|---|---|---|
| 3,450,684 | 6/1969 | Darby . |
| 3,784,471 | 1/1974 | Kaiser .................... 252/58 |
| 4,248,726 | 2/1981 | Uchinuma et al. ............ 252/68 |
| 4,267,064 | 5/1981 | Sasaki et al. ............... 252/68 |
| 4,324,673 | 4/1982 | Christian et al. ........... 252/58 |
| 4,472,290 | 9/1984 | Caporiccio et al. .......... 252/58 |
| 4,657,687 | 4/1987 | Caporiccio et al. .......... 252/58 |
| 4,724,092 | 2/1988 | Fukui et al. . |
| 4,755,316 | 7/1988 | Magid et al. . |
| 4,836,944 | 6/1989 | Tohzuka et al. ............. 252/58 |
| 4,845,268 | 7/1989 | Ohsaka et al. .............. 252/58 |

FOREIGN PATENT DOCUMENTS

| | | |
|---|---|---|
| 0062516 | 12/1982 | European Pat. Off. ........ 252/68 |
| 148482 | 8/1985 | European Pat. Off. . |
| 6070082 | 6/1981 | Japan ..................... 252/68 |

OTHER PUBLICATIONS

Pool, R., *Science* 242:666–668, (1988).
Caporiccio, G. in *Fluorine—The First Hundred Years*, Banks, R. E. et al., (Eds.), pp. 314–320, (1986).

*Primary Examiner*—A. Lionel Clingman
*Assistant Examiner*—J. Darland
*Attorney, Agent, or Firm*—Hamilton, Brook, Smith & Reynolds

[57] ABSTRACT

This invention pertains to the use of chlorofluoropolyethers, such as perfluoropolyepichlorohydrin as lubricants for cooling systems which employ hydrofluorocarbon refrigerants, such as 1,1,1,2-tetrafluoroethane.

18 Claims, 1 Drawing Sheet

USE OF CHLOROFLUOROPOLYETHERS AS LUBRICANTS FOR REFRIGERANTS

BACKGROUND OF THE INVENTION

Chlorofluorocarbons are compounds widely used as refrigerants, cleaning fluids, propellants and blowing agents for foam manufacture. Despite the versatility of chlorofluorocarbons (CFCs), they have been directly linked to the depletion of the earth's ozone layer. As a result, these compounds are being replaced by hydrofluorocarbon (HFC) compounds and hydrochlorofluorocarbon (HCFC) compounds which do not adversely affect the environment.

Several potential replacements for CFC compounds are 1,1,1,2-tetrafluoroethane, also known as HFC-134a, and chlorodifluoromethane ($CHClF_2$), also known as HCFC-22. Both HFC-134a and HCFC-22 have important uses in refrigeration and cooling systems. As such, HFC-134a has been developed as a replacement for dichlorodifluoromethane, commonly known as Freon™ 12.

HFC-134a, in particular, may be a good refrigerant replacement since its physical properties (boiling point, molecular weight and nonflammability) are similar to Freon™ 12. A major disadvantage of using HFC-134a as a refrigerant is that it is not miscible with existing mineral oils and other commonly used lubricants. This poses serious problems in providing a compressor component of a cooling or heating system with proper lubrication.

One reported refrigeration lubricant is a composition of tetrafluoroethane and polyoxyalkylene glycol (see U.S. Pat. No. 4,755,316, Magid et al., July 5, 1988).

SUMMARY OF THE INVENTION

This invention pertains to the use of chlorofluoropolyethers to impart lubricity to hydrofluorocarbon (HFC) refrigerants used in cooling and heating systems such as air conditioners, refrigerators and heat pumps. This invention also pertains to compositions comprising an HFC refrigerant and a miscible chlorofluoropolyether lubricant in an amount sufficient to impart lubricity to the refrigerant. The HFC can be tetrafluoroethane, dichlorodifluoromethane, difluoromethane, or mixtures thereof. A preferred chlorofluoropolyether is perfluoropolyepichlorohydrin.

BRIEF DESCRIPTION OF THE FIGURE

The figure shows the miscibility of several chlorofluoropolyethers in tetrafluoroethane as a function of temperature.

DETAILED DESCRIPTION OF THE INVENTION

Figure 1:
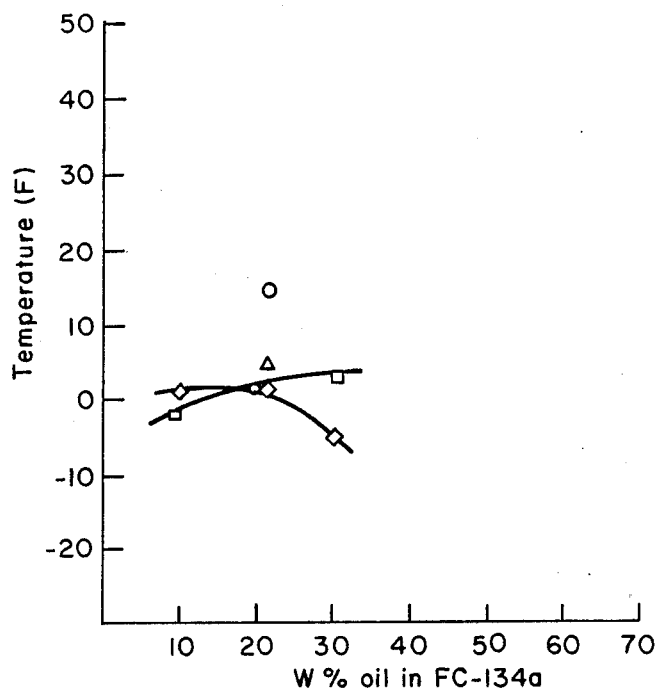

This invention pertains to a composition comprising a hydrofluorocarbon refrigerant and an amount of chlorofluoropolyether that is miscible therewith to impart desired lubricity to the refrigerant. The term "refrigerant" as used herein is a compound which can vaporize at low temperature and absorb heat as it is vaporized. A refrigerant, however, can also be used to give off heat by condensing it, as is its function in heat pumps, for example.

The preferred refrigerant is 1,1,1,2-tetrafluoroethane(HFC-134a); however, its symmetrical isomer, 1,1,2,2-tetrafluoroethane, can also be used. The term "tetrafluoroethane" used herein is intended to encompass all isomeric forms of the compound. Additionally, the tetrafluoroethane refrigerant can be mixed with other refrigerants such as dichlorodifluoromethane and chlorodifluoromethane and mixtures of these. In another embodiment the refrigerant can be chlorodifluoromethane, 1,1-difluoroethane ($CH_3CF_2H$; commonly known as HCFC-152a), 1-chloro-1,1,1-tetrafluoroethane ($CF_3CFClH$; commonly known as HCFC-124) or mixture thereof.

In the preferred embodiment, the composition comprises tetrafluoroethane and a chlorofluoropolyether lubricant miscible herewith. The amount of chlorofluoropolyether is that sufficient to impart desired lubricity to the HFC without adversely or significantly decreasing its cooling or heating capability. The ratio of chlorofluoropolyether lubricant to refrigerant in a heating or cooling system can vary, for example, between 1:20 and 20:1. The preferred weight ratio is between 1:5 and 5:1. The chlorofluoropolyether used in this invention should be chemically stable and non-reactive with the refrigerant or the cooling or heating system component it is in contact with.

In other embodiments, the composition of this invention comprises a mixture of one or more refrigerants, selected from the group consisting of hydrofluorocarbon, tetrafluoroethane, chlorofluorocarbon, dichlorodifluoromethane, and one or more different chlorofluoropolyether lubricants. Preferably, the refrigerant is a mixture of tetrafluoroethane and dichlorodifluoromethane.

Chlorofluoropolyethers of this invention which function as lubricants, contain from about 5 to about 50 wt % chlorine. Preferably, the chlorofluoropolyethers will contain from about 15 to about 40 wt % chlorine. The chlorofluoropolyethers which can be used in the compositions of this invention are miscible in the refrigerant of choice and impart lubricity thereto, unlike the commercially available perfluoropolyethers. The chlorofluoropolyether can be mixed with the refrigerant either separately or in combination with other chlorofluoropolyethers to form the compositions of the invention. A suitable chlorofluoropolyether lubricant has a boiling point of greater than 200° C., a viscosity of from about 0 to about 200 centistokes at 40° C. and a viscosity index of at least 20. The chlorofluoropolyether is a liquid at about 10° C. and miscible in the refrigerant at from about -18° C. to about 100° C. (see FIG. 1). The chlorofluoropolyether lubricants having a viscosity within the above range typically have a molecular weight from about 500 to about 5,000 a.m.u. Preferably, the molecular weight will be from about 1,000 to about 3,000 a.m.u.

The chlorofluoropolyether lubricants can be added to the refrigerant to form a miscible composition. The composition can then be introduced into the cooling or heating system to provide the system with both a refrigerant and lubricant which can circulate throughout the system as a miscible mixture. To ensure proper lubrication of the system, it is necessary for the composition to remain miscible throughout the entire range of refrigeration temperatures, which may range from about -7° C. to about 100° C.

In another embodiment the compositions of the invention can further comprise additives which enhance the performance of the composition. Such additives can be selected from (1) extreme pressure and antiwear additives, (2) oxidation and thermal stability improvers, (3) corrosion inhibitors, (4) viscosity index improvers (5) pour and floc point depressants, (6) detergents, (7) antifoaming agents and (8) viscosity adjusters.

Alternatively, the chlorofluoropolyether lubricant can be added directly to a cooling or heating system containing one or more refrigerants therein. The chlorofluoropolyether mixes with the refrigerant as each is circulated through the system.

The compositions of the invention can be used in refrigerators, air conditioning systems and heat pumps to provide adequate lubrication to the compressor. Compositions of this invention can also be used to lubricate any system in which it is necessary to circulate a lubricant which is miscible in a hydrofluorocarbon. chlorofluorocarbon or chlorofluorohydrocarbon.

The chlorofluoropolyethers can be made by directly fluorinating polymers made by the polymerization of acetals, ketals polyacetals, polyketals and orthoesters with elemental fluorine as described in U.S. patent application Ser. No. 07/250,384, filed Sept. 28, 1988, entitled "Fluorination of Acetals, Ketals and Orthoesters", the teachings of which are incorporated by reference herein. Such fluorination results in a fluorinated product that has essentially none or very few residual hydrogen atoms or functional (or reactive) groups or moieties. Further, any residual hydrogen atoms or functional groups can be subsequently replaced with fluorine by subjecting the chlorofluoropolyether to high temperature fluorination, however, such removal is optional.

There are several classes of chlorofluoropolyethers which are useful as lubricants in the compositions of this invention. One such class are oligomeric or polymeric chlorofluoropolyethers having the average formula:

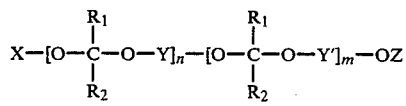
                                                  I where X and Z represent terminal groups selected from the group consisting of $-CF_2OCF_3$ and $C_rF_{2r+l-q}Cl_q$ where r is an integer from 1 to 5 and q is an integer from zero and 11, such as $-CF_3$, $-C_2F_5$, $-C_3F_7$, $-C_4F_9$, $-CF_2Cl$ and $-CFCl_2$ groups. The groups $R_1$ and $R_2$ may be the same or different and are selected from the group consisting of $-F$, $-Cl$, $-CF_3$, $-CF_2Cl$, $-CFCl_2$, $-CCl_3$, $-C_2F_5$, $-C_4F_9$, $-OCF_3$, $-OC_2F_5$, perfluoroalkyl of 1 to 10 carbon atoms, perfluoroalkoxy of 1 to 10 carbon atoms, and groups like the foregoing where the fluorine may be substituted with one or more halogen groups other than fluorine, e.g., chlorine. Y and Y' are selected from the group consisting of branched or linear perfluoroalkylenes, perfluoroxyalkylenes, isotactic perfluoropolyoxyalkylenes or atactic perfluoropolyoxyalkylenes, such as $-CF_2-CF_2-CF_2$, $-CF_2-CF_2-CF_2-CF_2-$, $-CF_2-CF_2O-CF_2-CF_2-$, $-CF_2-(CF_3)-CF-O-CF(CF_3)-CF_2-$, $-CF_2CF(CF_2CL)O-$, and $-CF_2-CF_2-O-CF_2O-CF_2CF_2-$. The perfluoropolyethers comprising Y and Y' are random or non-random and may be isotactic, atactic or block copolymers. The subscript m is an integer between 0 and 50. The subscript n is an integer between 1 and 50. The chlorofluoropolyethers of formula I must have at least two chlorine atom.

The subscripts n and m are average indices of composition such that when m is zero the polyether of Formula I is referred to as an alternating copolymer of:

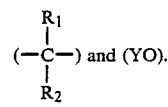

When m and n are greater than zero, the polyether is a terpolymer containing:

groups having alternate Y and Y' units.

The following examples show some chlorofluoropolyethers of Formula I where m is zero and either X or Z or both have at least one chlorine atom:

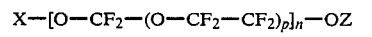

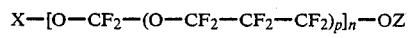

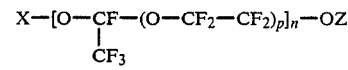

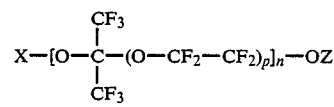

Other examples of the polyethers of Formula I where m is zero, Y is an isotactic perfluoropolyether or atactic fluoropolyether and either X or Z or both have at least two chlorine atoms, are shown below:

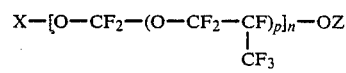

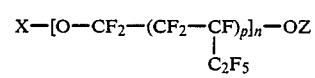

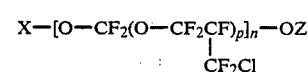

Examples of random copolymers in which m and n are greater than zero and which have at least two chlorine atoms, include:

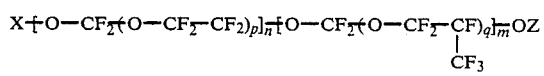

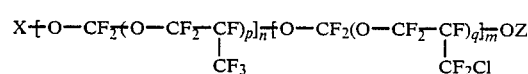

Another class of chlorofluoropolyether useful as lubricants in this invention are those miscible in the hydrofluorocarbon refrigerant, which have the average formula:

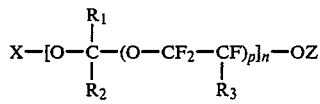

wherein X and Z are selected from the group consisting of —CF$_2$OCF$_3$ and C$_r$F$_{2r+1-q}$Cl$_q$; wherein r is an interger from 1 to 5 and q is an integer from 0 to 11; wherein R$_1$, R$_2$ and R$_3$ are the same or different and are selected from the group consisting of —F, —Cl, —CF$_2$Cl, —CFCl$_2$, —CCl$_3$, and perfluoroalkyl of 1 to 10 carbons wherein fluorine may be substituted with one or more halogen groups other than fluorine, such as, chlorine; wherein the perfluoroalkyl group may contain one or more ether oxygen atoms; wherein p is an integer between 1 and 50; n is an integer between 1 and 50; and wherein the chlorofluoropolyether has at least two chlorine atoms.

Still another class of chlorofluoropolyether lubricants of this invention have the average formula:

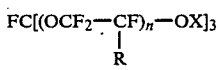

or

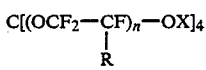

wherein X is selected from the group consisting of —CF$_3$, —C$_2$F$_5$, —CF$_2$OCF$_3$; wherein n is an integer from 1 to 50; and wherein R is selected from the group consisting of —F, —CF$_2$Cl, —CFCl$_2$, CCl$_3$ and perfluoroalkyl of 1 to 10 carbons, having one or more chlorine atoms such that the molecule has at least two substituent chlorine atoms.

Another class of chlorofluoropolyether lubricants of this invention have the average formula:

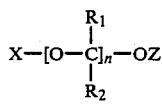

wherein X and Z are selected from the group consisting of —CF$_2$OCF$_3$ and C$_r$F$_{2r+1-q}$, wherein r is an integer from 1 and 5 and q is an integer from zero and 11; wherein R$_1$ and R$_2$ are the same or different and are selected from the group consisting of —F, —Cl, —CF$_2$CL, —CFCL$_2$, —CCl$_3$ and perfluoroalkyl of 1 to 10 carbon atoms which may contain one or more ether oxygen atoms; wherein the fluorine of the foregoing groups may be substituted with one or more halogen groups other than fluorine, such as chlorine; wherein n is an integer from 1 to 50; and wherein the chlorofluoropolyether has at least two chlorine atoms.

Yet another class of chlorofluoropolyether lubricants of this invention is represented by the formula:

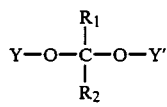

wherein Y and Y' are the same or different and are selected from the group consisting of perfluoroalkyl, perfluoroalkoxyalkyl and perfluoropolyalkoxyalkyl; wherein R$_1$ and R$_2$ are the same or different and are selected from the group consisting of —F, —Cl, —CF$_2$Cl, —CFCl$_2$, —CCl$_3$ and perfluoroalkyl of 1 to 10 carbon atoms; wherein fluorine in the foregoing groups may be substituted with one or more halogen groups other than fluorine, such as, chlorine; wherein the perfluoroalkyl group may contain one or more ether oxygens; and wherein the chlorofluoropolyether has at least two chlorine atoms. The perfluoroalkylpolyether may be atactic, isotactic or a block copolymer having 1 to 50 carbon atoms. Examples of two polymers of Formula VI are Y—O—CF$_2$—OY and Y—O—CF—(CF$_3$)—OY, wherein Y is the same.

Another class of chlorofluoropolyethers that are suitable lubricants in this invention can be made by fluorinating addition polymers made by ring-opening polymerization of cyclic ethers epoxides, as described in U.S. patent application Ser. No. 07/251,135, filed Sept. 28, 1988, entitled "Fluorination of Epoxides", the teachings of which are incorporated herein by reference. Chlorofluoropolyether lubricants of this class are oligomers or polymers which have the general formula:

$$XO-[Y-O]_n[Y'-O]_m-Z \qquad \text{VII}$$

where Y and Y' are the same or different and are selected from the group consisting of

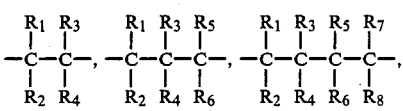

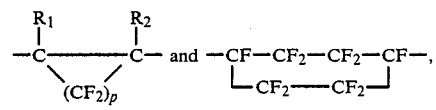

wherein p is an integer from 1 to 10; and wherein R$_1$, R$_2$, R$_3$, R$_4$, R$_5$, R$_6$, R$_7$ and R$_8$, either separately or together are, F, Cl, a perfluoroalkyl of 1 to 10 carbons or a perfluoroalkyl ether of 2 to 10 carbons, and wherein the fluorine of the foregoing groups may be substituted with one or more halogen groups other than fluorine. X and Z represent the terminal groups and are fluoroalkyls (such as —CF$_3$, —C$_2$F$_5$, —C$_3$F$_7$, —C$_4$F$_9$, —CF$_2$Cl and —CFCl$_2$), perfluoroester or perfluoropolyester wherein fluorine may be substituted with one or more halogen groups other than fluorine, such as chlorine, m is an integer from 0 to 50 and n is an integer from 1 to 50; and wherein the chlorofluoropolyether has at least two chlorine atoms.

n and m are average indices of composition such that when m is zero the polyether is referred to as an isotactic or atactic homopolymer being composed of the repeating unit (YO); when m and n are both greater than zero the polyether is referred to as either a random copolymer, alternating copolymer or block copolymer of (YO) and (Y'O).

A preferred chlorofluoropolyether of formula VII is perfluoropolyepichlorophydrin having the general formula:

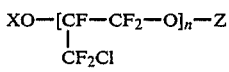

$$XO-[CF-CF_2-O]_n-Z \quad\quad VIII$$
$$\phantom{XO-[}|\phantom{CF}$$
$$\phantom{XO-[}CF_2Cl$$

wherein X, Z and n are previously defined. The term "perfluoro" as used herein is intended to mean a compound having all or essentially all hydrogen atoms replaced with fluorine atoms. Preferred perfluoropolyepichlorohydrin lubricants of this invention will have a molecular weight of from 500 to about 5000 atomic mass units.

The following examples will further illustrate the invention, but are not to be construed as limiting its scope.

EXAMPLE 1

A Polyepichlorohydrin telomer having an average molecular weight of 1500 a.m.u. was fluorinated using the procedures outlined in U.S. patent application Ser. No. 07/251,135, filed Sept. 28, 1988, entitled "Fluorination of Epoxides". The resulting fluorinated fluid had an average molecular weight of about 1500 a.m.u. The fluid had a kinematic viscosity of 43.0 at 40° C. and 5.7 cst. at 100° C., giving a Viscosity Index of 56.5 (ASTM 2270).

EXAMPLE 2

A portion of the sample described in Example 1 was distilled to remove the more volatile components. Upon removal of 20% of the sample, the remaining fluid had a viscosity of 107.9 at 40° C. and 9.9 cst. at 100° C., giving a Viscosity Index of 58.6.

EXAMPLE 3

A polyepichlorohydrin telomer having an average molecular weight of 750 a.m.u., which was a volatile fraction of the product of Example 2, was fluorinated to give a fluorinated product which also had an average molecular weight of about 750 a.m.u. The fluid had a kinematic viscosity of 2.9 at 40° C. and 1.0 cst. at 100° C.

A polyepichlorohydrin telomer having an average molecular weight of 1800 a.m.u. was fluorinated to give a fluorinated product which also had an average molecular weight of about 1800 a.m.u. The lubricant had a viscosity of 52.9 cst. at 40° C. and 19.53 cst. at 100° C. giving a Viscosity Index of 141.4.

EXAMPLE 5

A portion of the sample described in Example 4 was distilled to remove the more volatile components. Upon removal of 20% of the sample the remaining fluid had a viscosity of 135.4 at 40° C. and 81.22 cst. at 100° C., giving a Viscosity Index of 143.8.

EXAMPLE 6

The miscibility of the lubricants (described in Examples 1-5) in 1,1,1,2-tetrafluoroethane (HFC-134a) was determined over a wide range of temperatures using varying lubricant to refrigerant ratios. Known amounts of refrigerant and lubricant were placed in glass tubes which were then sealed. The tube was placed in a constant temperature bath and observed for at least 24 hours to determine if a phase separation occurred. Each of the fluid lubricants tested was completely miscible with HFC-134a from at least 100° C. down to the point shown in the Figure (the current specification of mobile air conditioning lubricants) when present over a wide range of concentrations.

The Figure shows the results of miscibility of polyepichlorohydrin telomers described above, in HFC-134a as a function of temperature. Note that miscibility of the chlorofluoropolyethers occurs above the curve. The solubility of the various telomers described in Examples 1, 2, 4 and 5 are indicated by the symbols, □, Δ, and , respectively, for a range of temperatures.

EXAMPLE 7

The lubricity of two lubricants was determined using a Falex Four-Ball wear test. Lubricants 1 and 2 correspond to perfluoropolyepichlorohydrin compounds described in Examples 1 and 2, respectively. The specimen ball, AISI E52100 steel having a hardness of 64 to 66, was rotated at 1760±40 RPM at 25° C. for 10 seconds. The results obtained are shown in Tables 1 and 2.

The results show that the lubricity of the perfluoroepichlorohydrin lubricants tested exceeded that of two perfluoropolyethers. Fomblin™ Z25 and Fomblin™ Y25. Lubricity data for Fomblin™ Y25 and Fomblin™ Z25 based on ASTM D2266-67 for welding load was reported to be 400 and 500kg, respectively Banks R.E., et. al. (Eds.) pp 314–320 (1986 ). As shown in Tables 1 and 2, the welding loads for each of the two perfluoropolyepichlorohydrin lubricants, under almost identical conditions, exceeded 800 kg.

TABLE 1

LUBRICANT NO. 1

| Applied Load, kg$^A$ (L) | Average Scar Diameter, mm (X) | Compensation Scar Diameter, mm | LD$_h$ Factor | Corrected Load kg$^A$(LD$_h$/X) |
|---|---|---|---|---|
| 80 | 0.52 | 0.42 | 30.08 | 57.85 |
| 100 | 0.62 | 0.46 | 40.5 | 65.32 |
| 126 | 0.68 | 0.50 | 55.2 | 81.18 |
| 160 | 0.73 | 0.54 | 75.8 | 103.84 |
| 200 | 0.83 | 0.59 | 102.2 | 123.13 |
| 250 | 0.90 | — | 137.5 | 152.78 |
| 315 | 1.00 | — | 187.1 | 187.1 |
| 400 | 1.18 | — | 258 | 218.64 |
| 500 | 1.39 | — | 347 | 249.64 |
| 620 | 1.52 | — | 462 | 303.95 |
| 800 | 1.66 | — | 649 | 390.96 |

Load Wear Index: ≧187.65
Weld Point, kgf: >800

TABLE 2

LUBRICANT NO. 2

| Applied Load, kg$^A$ (L) | Average Scar Diameter, mm (X) | Compensation Scar Diameter, mm | LD$_h$ Factor | Corrected Load kg$^A$(LD$_h$/X) |
|---|---|---|---|---|
| 80 | 0.61 | 0.42 | 30.08 | 49.31 |
| 100 | 0.63 | 0.46 | 40.5 | 64.29 |
| 126 | 0.71 | 0.50 | 55.2 | 77.75 |
| 160 | 0.83 | 0.54 | 75.8 | 91.33 |
| 200 | 0.86 | 0.59 | 102.2 | 118.84 |
| 250 | 0.92 | — | 137.5 | 149.46 |
| 315 | 1.03 | — | 187.1 | 181.65 |
| 400 | 1.27 | — | 258 | 203.15 |
| 500 | 1.40 | — | 347 | 247.86 |
| 620 | 1.49 | — | 462 | 310.07 |
| 800 | 1.72 | — | 649 | 377.33 |

Load Wear Index: ≧182.17
Weld Point, kgf: >800

EQUIVALENTS

Those skilled in the art will recognize or be able to ascertain using no more than routine experimentation many equivalents to the specific embodiments of the invention described herein. Such equivalents are intended to be encompassed by the following claims:

We claim:

1. A composition, comprising:
   (a) hydrofluorocarbon refrigerant; and
   (b) an amount of chlorofluoropolyether lubricant sufficient to impart desired lubricity thereto, wherein the chlorofluoropolyether lubricant has a molecular weight of from about 1000 to about 5000 amu, a viscosity of about zero to about 200 centistokes at 40° C., a viscosity index of at least 20 and miscible in the refrigerant at from about −18° C. to about 100° C.; wherein the chlorofluoropolyether has an average formula:

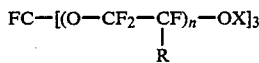

wherein X is selected from the group consisting of —CF$_3$, —C$_2$F$_5$ and —CF$_2$OCF$_3$; wherein n is an integer from 1 to 50; wherein R is selected from the group consisting of —F, —CF$_2$Cl, —CFCl$_2$, CCL$_3$ and perfluoroalkyl of one to ten carbons; and wherein the chlorofluoropolyether has at least two chlorine atoms.

2. A composition, comprising:
   (a) hydrofluorocarbon refrigerant; and
   (b) an amount of chlorofluoropolyether lubricant sufficient to impart desired lubricity thereto, wherein the chlorofluoropolyether lubricant has a molecular weight of from about 1000 to about 5000 amu, a viscosity of about zero to about 200 centistokes at 40° C., a viscosity index of at least 20 and miscible in the refrigerant at from about −18° C. to about 100° C.; wherein the chlorofluoropolyether has an average formula:

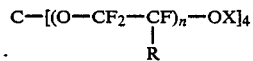

wherein X is selected from the group consisting of —CF$_3$, —C$_2$F$_5$ and —CF$_2$OCF$_3$; wherein n is an integer from 1 to 50; wherein R is selected from the group consisting of —F, —CF$_2$Cl, —CFCl$_2$, CCl$_3$ and perfluoroalkyl of one to ten carbons; and wherein the chlorofluoropolyether has at least two chlorine atoms.

3. A composition of claim 2, wherein the refrigerant is selected from the group consisting of hydrofluorocarbon, tetrafluoroethane, chlorofluorocarbon, dichlorodifluoromethane, 1,1-difluoroethane, 1-chloro-1,1,1-tetrafluoroethane and mixtures thereof.

4. A composition of claim 3, wherein the hydrofluorocarbon refrigerant is tetrafluoroethane.

5. A composition of claim 4, wherein the tetrafluoroethane is 1,1,1,2-tetrafluoroethane.

6. A composition of claim 2, further comprising dichlorodifluoromethane refrigerant.

7. A composition of claim 2, wherein the chlorofluoropolyether lubricant comprises a mixture of one or more different chlorofluoropolyether lubricants.

8. A composition of claim 2, having a weight ratio of hydrofluorocarbon refrigerant to chlorofluoropolyether lubricant is from about 1:20 to about 20:1.

9. A composition of claim 8, wherein the weight ratio of hydrofluorocarbon refrigerant to chlorofluoropolyether lubricant is from about 1:5 to about 5:1.

10. The composition of claim 2, further comprising:
    (c) additive to enhance the performance of the composition selected from the group consisting of (1) extreme pressure and antiwear additives, (2) oxidation and thermal stability improvers, (3) corrosion inhibitors, (4) viscosity index improvers, (5) pour and floc point depressants, (6) detergents, (7) antifoaming agents and (8) viscosity adjusters.

11. A composition of claim 9 wherein the refrigerant is selected from the group consisting of hydrofluorocarbon, tetrafluoroethane, chlorofluorocarbon, dichlorodifluoromethane, 1,1difluoroethane, 1chloro-1,1,1-tetrafluoroethane and mixtures thereof.

12. A composition of claim 11 wherein the hydrofluorocarbon refrigerant is tetrafluoroethane.

13. A composition of claim 12 wherein the tetrafluoroethane is 1,1,1,2-tetrafluoroethane.

14. A composition of claim 1 further comprising dichlorodifluoromethane refrigerant.

15. A composition of claim 1 wherein the chlorofluoropolyether lubricant comprises a mixture of one or more different chlorofluoropolyether lubricants.

16. A composition of claim 1 having a weight ratio of hydrofluorocarbon refrigerant to chlorofluoropolyether lubricant is from about 1:20 to about 20:1.

17. A composition of claim 16 wherein the weight ratio of hydrofluorocarbon refrigerant to chlorofluoropolyether lubricant is from about 1:5 to about 5:1.

18. The composition of claim 1 further comprising:
    (c) additive to enhance the performance of the composition selected from the group consisting of (1) extreme pressure and antiwear additives, (2) oxidation and thermal stability improvers, (3) corrosion inhibitors, (4) viscosity index improvers, (5) pour and floc point depressants, (6) detergents, (7) antifoaming agents and (8) viscosity adjusters.

* * * * *